United States Patent
Han et al.

(10) Patent No.: US 9,728,781 B2
(45) Date of Patent: Aug. 8, 2017

(54) SODIUM MANGANESE COMPOSITE OXIDE AND ELECTRODE AND SODIUM SECONDARY BATTERY USING THE SAME

(71) Applicant: Samsung Electronics Co., Ltd., Suwon-si, Gyeonggi-do (KR)

(72) Inventors: Dongwook Han, Yongin-si (KR); Seoksoo Lee, Yongin-si (KR); Guesung Kim, Yongin-si (KR); Ryounghee Kim, Yongin-si (KR); Kwangjin Park, Seongnam-si (KR); Wonseok Chang, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 377 days.

(21) Appl. No.: 14/499,408

(22) Filed: Sep. 29, 2014

(65) Prior Publication Data

US 2015/0093644 A1   Apr. 2, 2015

(30) Foreign Application Priority Data

Sep. 30, 2013 (KR) .......................... 10-2013-0116911

(51) Int. Cl.
| | |
|---|---|
| *H01M 4/505* | (2010.01) |
| *H01M 10/054* | (2010.01) |
| *C01G 45/12* | (2006.01) |
| *H01M 4/525* | (2010.01) |
| *H01M 4/485* | (2010.01) |

(52) U.S. Cl.
CPC ........ *H01M 4/505* (2013.01); *C01G 45/1228* (2013.01); *H01M 10/054* (2013.01); *C01P 2002/76* (2013.01); *C01P 2006/40* (2013.01); *H01M 4/485* (2013.01); *H01M 4/525* (2013.01); *H01M 2220/30* (2013.01)

(58) Field of Classification Search
CPC .... H01M 4/505; H01M 4/525; H01M 10/054; H01M 4/381; H01M 2004/021
See application file for complete search history.

(56) References Cited

U.S. PATENT DOCUMENTS

| 6,316,141 B1 | 11/2001 | Aurbach et al. |
| 6,960,335 B1 * | 11/2005 | Singhal ................. B82Y 30/00 |
| | | 423/594.15 |

(Continued)

FOREIGN PATENT DOCUMENTS

| CN | 101320806 A | | 12/2008 |
| CN | 103840149 A | * | 6/2014 |

(Continued)

OTHER PUBLICATIONS

English Translation of CN103840149A.*

(Continued)

*Primary Examiner* — Stewart Fraser
(74) *Attorney, Agent, or Firm* — Cantor Colburn LLP (57) ABSTRACT

A sodium manganese composite oxide represented by Formula 1:

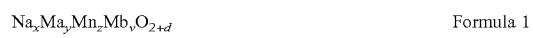

$Na_xMa_yMn_zMb_vO_{2+d}$     Formula 1 wherein, $0.2 \leq x \leq 1$, $0 < y \leq 0.2$, $0 < z \leq 1$, $0 \leq v < 1$, $0 < z+v \leq 1$, $-0.3 \leq d < 1$, Ma is an electrochemically inactive metal, and Mb is different from Ma and Mn, and is at least one transition metal selected from elements in Groups 4 to 12 of the periodic table of the elements.

22 Claims, 5 Drawing Sheets

(56) References Cited

U.S. PATENT DOCUMENTS

| | | |
|---|---|---|
| 7,695,868 B2 | 4/2010 | Inoue et al. |
| 7,759,008 B2 | 7/2010 | Barker et al. |
| 8,815,449 B2 | 8/2014 | Inoue et al. |
| 2010/0261051 A1 | 10/2010 | Okada et al. |
| 2011/0003192 A1 | 1/2011 | Kuze et al. |
| 2011/0262804 A1 | 10/2011 | Muldoon et al. |
| 2012/0015230 A1 | 1/2012 | Kuze et al. |
| 2012/0183837 A1 | 7/2012 | Johnson et al. |
| 2015/0207138 A1* | 7/2015 | Barker .................. C01G 53/42 429/223 |

FOREIGN PATENT DOCUMENTS

| | | | |
|---|---|---|---|
| GB | WO 2014009724 A1 * | 1/2014 | ............. C01G 53/42 |
| JP | 2012206925 A | 10/2012 | |
| JP | 5515306 B2 | 4/2014 | |
| KR | 1020140008104 A | 1/2014 | |
| KR | 1020140081507 A | 7/2014 | |
| WO | 2011150093 A1 | 12/2011 | |

OTHER PUBLICATIONS

Patoux et al. (Layered Manganese Oxide Intergrowth Electrodes for Rechargeable Lithium Batteries. 2. Substitution with Al, Chem. Mater. 2005, 17, 1044-1054).*

* cited by examiner

SODIUM MANGANESE COMPOSITE OXIDE AND ELECTRODE AND SODIUM SECONDARY BATTERY USING THE SAME

RELATED APPLICATION

This application claims priority to and the benefit of Korean Patent Application No. 10-2013-0116911, filed on Sep. 30, 2013, in the Korean Intellectual Property Office, and all the benefits accruing therefrom under 35 U.S.C. §119, the content of which is incorporated herein in its entirety by reference.

BACKGROUND

1. Field

The present disclosure relates to sodium manganese composite oxides and electrodes and sodium secondary batteries including the same.

2. Description of the Related Art

As mobile electronic devices such as video cameras, mobile phones, and laptop computers have become lightweight and highly functional, research is being conducted into high capacity and high energy density batteries that may be used as power supplies for driving such devices.

Lithium batteries have energy densities that are three times as high as those of lead-acid batteries, nickel-cadmium batteries, nickel metal hydride batteries, nickel-zinc batteries, or the like, and may be rapidly charged and thus, the lithium batteries are commonly used for commercial purposes.

However, the lithium batteries have stability problems due to highly reactive lithium and the element lithium is expensive. Thus there remains a need for improved battery technology.

SUMMARY

According to an aspect, provided is a novel sodium manganese composite oxide for sodium batteries having improved electrical conductivity and structural stability.

According to another aspect, provided is an electrode including the sodium manganese composite oxide.

According to another aspect, provided is a sodium battery including the electrode.

Additional aspects will be set forth in part in the description which follows and, in part, will be apparent from the description.

According to an aspect, provided is a sodium manganese composite oxide represented by Formula 1:

$$Na_xMa_yMn_zMb_vO_{2+d}$$  Formula 1 wherein, $0.2 \leq x \leq 1$, $0 < y \leq 0.2$, $0 < z \leq 1$, $0 \leq v < 1$, $0 < z+v \leq 1$, and $-0.3 \leq d < 1$, Ma is an electrochemically inactive metal, and Mb is different from Ma and Mn, and is at least one transition metal selected from elements of Groups 4 to 12 of the periodic table of the elements.

Also disclosed is an electrode including the sodium manganese composite oxide.

Also disclosed is a sodium secondary battery including the electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Transition metal" as defined herein refers to an element of Groups 3 to 11 of the Periodic Table of the Elements.

A C rate means a current which will discharge a battery in one hour, e.g., a C rate for a battery having a discharge capacity of 1.6 ampere-hours would be 1.6 amperes.

Sodium batteries are environmentally friendly, and have a highly competitive price and excellent energy storage properties compared to the lithium batteries and thus, are being actively researched in regard to their use in medium to large batteries for electric power storage and electrical vehicles.

Regarding sodium manganese composite oxides for sodium batteries, sodium transition metal oxides including transition metals such as manganese (Mn), iron (Fe), nickel (Ni), cobalt (Co), vanadium (V), and chromium (Cr) may be used.

The sodium transition metal oxides have structural advantages in that they have large theoretical capacities and have sufficient pathways for the mobility of sodium ions in crystal structures thereof compared to phosphates or fluorophosphates including polyanions.

However, electrodes rapidly deteriorate due to transition of crystal structures according to a change of oxidation numbers of central metals of the sodium transition metal oxides during charge and discharge processes, thereby leading to poor lifespan characteristics of sodium batteries. Further, a high content of inactive sodium in the crystal structures of sodium transition metal oxide causes a poor discharge capacities of sodium batteries.

Accordingly, there remains a need for sodium manganese composite oxides that may be used to provide sodium batteries having improved discharge capacities and lifespan characteristics.

Hereinafter, a sodium manganese composite oxide according to an embodiment and an electrode and a sodium secondary battery including the sodium manganese composite oxide are disclosed in further detail. Unless specified otherwise in the present specification, a sodium battery refers to a sodium secondary battery.

The sodium manganese composite oxide according to an embodiment is represented by Formula 1:

Formula 1 wherein, $0.2 \leq x \leq 1$, $0 < y \leq 0.2$, $0 < z \leq 1$, $0 \leq v < 1$, $0 < z+v \leq 1$, and $-0.3 \leq d < 1$, Ma is an electrochemically inactive metal, Mb is different from Ma and Mn, and is at least one transition metal selected from elements of Groups 4 to 12 of the periodic table of the elements. For example, in Formula 1, $0.6 \leq x \leq 1$, $0.01 \leq y \leq 0.1$. For example, in Formula 1, $2/3 < x \leq 1$, $y=0.1$ $z=0.9$.

The sodium manganese composite oxide may include Ma, which is a metal which is electrochemically inactive between 2.0 volts and 3.8 volts versus Na/Na$^+$, to improve electrical conductivity and structural stability. Accordingly, initial discharge capacity and lifespan characteristics of a sodium battery including the sodium manganese composite oxide may be improved.

For example, in the sodium manganese composite oxide, an oxidation number of Ma, which is an electrochemically inactive metal, may not change during intercalation and deintercalation of sodium because Ma does not participate in an electrochemical reaction during intercalation and deintercalation of sodium. In other words, an oxidation number of Ma may not change during intercalation and deintercalation of sodium since Ma does not participate in an electrochemical reaction of the sodium manganese composite oxide by the intercalation and deintercalation of electron, which is accompanied by intercalation and deintercalation of sodium.

While not wanting to be bound by theory, suggested reasons for the improvement of electrical conductivity and structural stability of the sodium manganese composite oxide due to the inclusion of Ma, which is an electrochemically inert metal, will be disclosed in further detail below, but the description is only used to facilitate understanding and shall not limit the scope of the present disclosure.

For example, Ma, which is an electrochemically inactive metal between 2 and 3.8 volts versus Na/Na$^+$, included in the sodium manganese composite oxide may act as a kind of a dopant in the sodium manganese composite oxide. In other words, when Ma is added to the sodium manganese composite oxide, a concentration of carriers, such as electrons or holes, may increase in the sodium manganese composite oxide. Due to the increased concentration of the carriers, an overall electrical conductivity of the sodium manganese composite oxide may increase.

Also, when Ma, which is an electrochemically inactive metal, is disposed within a crystal structure of the sodium manganese composite oxide, distortions of the crystal structure, which may occur due to a change in the oxidation number of manganese during the charge and discharge process of sodium, may be prevented. For example, in a 6-coordinate manganese complex formed of a manganese central metal and 6 oxygen molecules coordinated to the manganese central metal, when the oxidation number of manganese changes from +4 to +3 during a discharge process of sodium, a bond length of Mn—O bond in a Z-axis direction increases, i.e., Jahn-Teller distortion occurs, which causes geometric structural changes to the crystal. However, by introducing Ma, which is a metal that does not participate in a charge and discharge process of the sodium manganese composite oxide, into the sodium manganese composite oxide composite, it is possible to suppress changes to the crystal structure of the manganese oxide composite, and thus, structural stability of the sodium manganese composite oxide may be improved during the charge and discharge process.

In the manganese oxide composite, Ma may be at least one metal selected from aluminum (Al), molybdenum (Mo), tungsten (W), zirconium (Zr), ruthenium (Ru), rhodium (Rh), palladium (Pd), and platinum (Pt), but the metal is not limited thereto and may be any metal that does not participate in an electrochemical reaction during the charge and discharge process of sodium. For example, Ma may be Al. For example, Ma may be a mixture of Al and at least one metal selected from Mo, W, Zr, Ru, Rh, Pd, and Pt.

In the sodium manganese composite oxide, Mb is a metal different from Ma and Mn, and may be at least one transition metal selected from Groups 8 to 10 of the periodic table of elements. For example, Mb may be at least one transition metal selected from iron (Fe), nickel (Ni), cobalt (Co), vanadium (V), titanium (Ti), and chromium (Cr). For example, Mb may be Fe, Ni, or Co.

In more detail, Mb$_v$ in the sodium manganese composite oxide of Formula 1 may be represented as $[(Mc_{v1})(Md_{v2})]$ $(0 \leq v1+v2<1)$. In other words, Mb may be at least two metals including Mc and Md. Mc and Md may be each independently at least one transition metal selected from elements in Groups 4 to 12 of the periodic table of elements, except Ma and Mn.

The sodium manganese composite oxide composite may have a monoclinic structure belonging to a C2/m space group as a crystal structure thereof. For example, the sodium manganese composite oxide may have a monoclinic structure that may be observed from peaks obtained from x-ray diffraction (XRD) spectra. For example, the sodium manganese composite oxide may have a monoclinic structure in a range of x=2/3 and 0<y≤0.01 in Formula 1.

Also, the sodium manganese composite oxide may have an orthorhombic structure belonging to a Pbam space group as its crystal structure. For example, the sodium manganese composite oxide may have an orthorhombic structure that may be observed from peaks obtained from XRD spectra. For example, the sodium manganese composite oxide may have the orthorhombic structure in a range of 0.2≤x≤2/3 and 0.01<y≤0.2 in Formula 1.

Also, the sodium manganese composite oxide may have a monoclinic-orthorhombic composite structure simultaneously including the monoclinic structure and the orthorhombic structure as a crystal structure thereof. For example, the sodium manganese composite oxide may simultaneously include a monoclinic structure and an orthorhombic structure that may be observed from peaks obtained from XRD spectra. For example, the manganese oxide composite may have the monoclinic-orthorhombic composite structure in the range of 2/3<x≤1 in Formula 1.

For example, in the sodium manganese composite oxide, the manganese oxide composite may be represented by Formula 2:

$$Na_xAl_yMn_zMb_vO_{2+d} \qquad \text{Formula 2}$$

wherein, 0.2≤x≤1, 0<y≤0.2, 0<z≤1, 0≤v<1, 0<z+v≤1, −0.3≤d<1, Mb is not Al and Mn, and is at least one transition metal selected from elements of Groups 4 to 12 of the periodic table of elements.

The manganese oxide composite in which Al is introduced may include an Al—O bond near the surface of the sodium manganese composite oxide. The presence of the Al—O bond may be confirmed through, for example, XPS spectra. Due to the presence of the Al—O bond near the surface of the sodium manganese composite oxide, an amount of an Mn—O bond present on the surface of the sodium manganese composite oxide decreases compared to the sodium manganese composite oxide that does not include Al and thus, an amount of Mn near the surface of the sodium manganese composite oxide may decrease. Accordingly, an amount of Mn ions that contact an electrolyte and elute into the electrolyte during a charge and discharge process of a sodium battery may decrease. As a result, deterioration of the sodium battery may be suppressed.

For example, in the sodium manganese composite oxide, the sodium manganese composite oxide may be represented by Formula 3:

$$Na_xAl_yMn_zMc_vO_{(2+d)} \qquad \text{Formula 3}$$

wherein, 0.2≤x≤1, 0<y≤0.2, 0<z≤1, 0≤v<1, 0<z+v≤1, −0.3≤d<1, and Mc is at least one transition metal selected from Fe, Ni, and Co. For example, in Formula 3, 0.6≤x≤1, 0.01≤y≤0.1. For example, in Formula 3, 2/3<x≤1, y=0.1, z=0.9.

When electrical conductivity of the sodium manganese composite oxide is measured by a 4 point probe method, the electrical conductivity may be 6×10$^{-6}$ Siemens per centimeter (S/cm) or greater under a load of 40 kilonewtons (kN) or greater. For example, electrical conductivity of the sodium manganese composite oxide may be 6.5×10$^{-6}$ S/cm or greater, 7×10$^{-6}$ S/cm or greater, 7.5×10$^{-6}$ S/cm or greater, or 8×10$^{-6}$ S/cm or greater. Since the sodium manganese composite oxide has an electrical conductivity of 6×10$^{-6}$ S/cm or greater, internal resistance of the positive electrode and the sodium battery including the sodium manganese composite oxide may decrease and thus, lifespan characteristics of the sodium battery may improve. The sodium manganese composite oxide does not substantially include lithium. In other words, the sodium manganese composite oxide including the sodium manganese composite oxide does not intentionally include lithium other than a minute quantity of residual lithium unintentionally included therein.

The sodium manganese composite oxide including the sodium manganese composite oxide may be, for example, manufactured as follows.

For example, the sodium manganese composite oxide may be prepared by calcining a mixture of metal containing compounds (i.e., a mixture of metal precursors) having a composition for forming the sodium manganese composite oxide. For example, a metal-containing compound including a corresponding metal element is weighed and mixed into a predetermined composition, and the composition obtained therefrom may be calcined to prepare the sodium manganese composite oxide. For example, a sodium manganese composite oxide having a metal element ratio of Na:Al:Mn=0.6:0.1:0.9, which is one of preferable metal element ratios, may be prepared by weighing each material of $Na_2CO_3$, $Mn_2O_3$, and $Al_2O_3$ into a molar ratio of Na:Al:Mn at 0.6:0.1:0.9, mixing the same, and calcining a mixture obtained therefrom.

The metal-containing compound that may be used to prepare the sodium manganese composite oxide may be a compound that may become an oxide when the compound is decomposed and/or oxidized at a high temperature. For example, hydroxide, carbonate, nitrate, halide, or oxalate may be used as a metal-containing compound. As a sodium compound, $Na_2CO_3$, $NaHCO_3$, $Na_2O_2$, or the like may be used, and more particularly, $Na_2CO_3$ may be used for better handling. As a manganese compound, $Mn_2O_3$, $MnO_2$, or the like may be used, and as an aluminum compound, $Al_2O_3$ may be used, but they are not limited thereto and any compound used in the art may be used. For example, the metal-containing compound may be a hydrate.

When mixing the metal-containing compound, a device that is conventionally used such as a ball mill, a V-type mixer, and an agitator may be used. To this end, a method of mixing may be any one of dry mixing and wet mixing. Also, a mixture of a metal-containing compound having a predetermined composition may be obtained by using a crystallization method.

Furthermore, the sodium manganese composite oxide may be obtained by calcining the mixture of the metal-containing compound, for example, at a temperature of about 600° C. to about 1600° C. for about 0.5 hours to about 100 hours. For example, a calcinations temperature may be in a range of about 700° C. to about 1100° C., for example, in a range of about 850° C. to about 950° C. When the compound that may be decomposed and/or oxidized at a high temperature is used as the metal-containing compound, for example, when a hydroxide, a carbonate, a nitrate, a halide, or an oxalate is used, a calcination may be performed after performing a pre-calcination. The pre-calcination may be performed at a temperature in a range of about 400° C. to about 1600° C. to prepare a metal oxide or remove water of crystallization. An atmosphere for performing the pre-calcination may be any one of an inert gas atmosphere, an oxidizing atmosphere, and a reducing atmosphere. Also, the oxide may be pulverized after the calcination.

An atmosphere for the calcination to be performed in may be, for example, any one of inert atmospheres such as nitrogen or argon; oxidizing atmospheres such as air, oxygen, oxygen-containing nitrogen, or oxygen-containing argon; and reducing atmospheres such as hydrogen-containing nitrogen, which contains hydrogen in an amount of about 0.1 volume percent (%) to about 10 volume %, or hydrogen-containing argon, which contains hydrogen in an amount of about 0.1 volume % to about 10 volume %. For calcining in a strong reducing atmosphere, a suitable amount of carbon may be included in a mixture of the metal-containing compound. For example, the calcination may be performed in an oxidizing atmosphere such as air.

Further, selectively, a proper amount of halide such as fluoride or chloride may be used as the metal-containing compound to control crystallinity of the composite metal oxide produced and an average diameter of particles forming the composite metal oxide. In this regard, halide may act as a reaction catalyst (flux). Examples of the flux include NaF, $MnF_3$, $FeF_2$, $NiF_2$, NaCl, $MnCl_2$, $FeCl_2$, $FeCl_3$, $NiCl_2$, $Na_2CO_3$, $NaHCO_3$, $NH_4Cl$, $NH_4I$, $B_2O_3$, and $H_3BO_3$, and the flux may be added as a raw material (a metal-containing compound) for a mixture or a suitable amount of the flux may be added to the mixture. Also, the flux may be a hydrate.

When the sodium manganese composite oxide is used as the sodium manganese composite oxide for the sodium secondary battery, a particle size thereof may be controlled through pulverizing, washing, and sorting the sodium manganese composite oxide obtained as described above by using a ball mill or a jet mill. Also, the calcination may be performed two or more times. Also, particles of the sodium manganese composite oxide may be surface-treated by, for example, coating a particle surface with an inorganic material such as silicon (Si), aluminum (Al), titanium (Ti), and yttrium (Y).

A positive electrode according to another embodiment includes the sodium manganese composite oxide.

In the sodium manganese composite oxide, the manganese oxide composite having the monoclinic-orthorhombic composite structure may have an enhanced initial discharge capacity than the manganese oxide composite having the orthorhombic structure.

For the sodium battery including the positive electrode that includes the sodium manganese composite oxide, a capacity retention rate after 100 cycles of charge and discharge in a range of about 2.0 V to about 3.8 V with respect to sodium metal at a constant current of 0.1 C rate may be 40% or greater. For example, the capacity retention rate may be 50% or greater, or 60% or greater. The sodium battery including the sodium manganese composite oxide may provide substantially improved lifespan characteristics compared to a manganese oxide that does not include Ma, which is an electrochemically inactive metal.

The electrode may be prepared as follows. The electrode may be a positive electrode.

For example, a positive active material composition in which a sodium manganese composite oxide, a conductor, a binder, and a solvent are mixed is prepared. The positive active material composition is directly coated on the current collector to prepare a positive electrode plate. Alternatively, the positive active material composition may be casted on a separate scaffold, and then a film peeled off from the scaffold may be laminated on the current collector to prepare the positive electrode plate. The positive electrode is not limited to the forms listed above, and may have a different form.

The positive electrode may additionally include a conventional positive active material in addition to the sodium manganese composite oxide.

For example, the conventional positive active material may be an oxide represented by $NaM^1_aO_2$ such as $NaFeO_2$, $NaMnO_2$, $NaNiO_2$, or $NaCoO_2$, an oxide represented by $Na_{0.44}Mn_{1-a}M^1_aO_2$, an oxide represented by $Na_{0.7}$ $Mn_{1-a}M^1{}_aO_{2.05}$ (wherein $M^1$ is at least one transition metal element, and $0 \le a < 1$); an oxide represented by $Na_bM^2{}_cSi_{12}O_{30}$ as $Na_6Fe_2Si_{12}O_{30}$ or $Na_2Fe_5Si_{12}O$ (wherein $M^2$ is at least one transition metal element, $2 \le b \le 6$, and $2 \le c \le 5$); an oxide represented by $Na_dM^3{}_eSi_6O_{18}$ such as $Na_2Fe_2Si_6O_{18}$ or $Na_2MnFeSi_6O_{18}$ (wherein $M^3$ is at least one transition metal element, $3 \le d \le 6$, and $1 \le e \le 2$); an oxide represented by $Na_fM^4{}_gSi_2O_6$ such as $Na_2FeSiO_6$ (wherein $M^4$ is at least one element selected from transition metal elements, magnesium (Mg) and aluminum (Al), $1 \le f \le 2$, and $1 \le g \le 2$); a phosphate such as $NaFePO_4$ or $Na_3Fe_2(PO_4)_3$; a borate such as $NaFeBO_4$ or $Na_3Fe_2(BO_4)_3$; and a fluoride represented by $Na_hM^5F_6$ such as $Na_3FeF_6$ or $Na_2MnF_6$ (wherein $M^5$ is at least one transition metal element, and $2 \le h \le 3$), but the conventional positive active material is not limited thereto and any positive active material that is used in the art may be used, as long as the positive active material does not decrease the performance of the sodium battery.

As the conductor, a carbonaceous material having a high specific surface area, for example, carbon black, active carbon, acetylene black, graphite fine particles or mixtures thereof may be used. Further, a vapor grown carbon or an electro-conductive fiber, such as a fiber produced by carbonizing pitch (a by-product of petroleum, coal, or coal tar) at a high temperature, a carbon fiber produced from acrylic fiber (polyacrylonitrile) and the like, may be used as the conductor. An electric conductivity may be further improved by simultaneously using the carbon fiber and the carbon material having a high specific surface area. Further, a metal-based conductor may be used as the conductor, and the metal-based conductor includes a material that is not oxidized in a charge and discharge range of the positive electrode and thus, does not dissolved, and has a lower electrical resistance than the positive active material. For example, a corrosion-resistive metal such as titanium or gold, a carbide such as SiC or WC, and a nitride such as $Si_3N_4$ or BN may be used. However, the conductor used in manufacturing the positive electrode is not limited to those listed above and may be any conductor used in the art.

A polymer of a fluorine containing compound (that is, a fluoropolymer) may be used as the binder. The fluoropolymer may be, for example, fluoroalkyl (C1-C18)(meth)acrylate, perfluoroalkyl(meth)acrylate (for example, perfluorododecyl(meth)acrylate, perfluoro n-octyl(meth)acrylate, perfluoro n-butyl(meth)acrylate), perfluoroalkyl substituted alkyl(meth)acrylate (for example, perfluorohexylethyl (meth)acrylate, perfluorooctylethyl(meth)acrylate, perfluorooxyalkyl(meth)acrylate (for example, perfluorododecyl oxyethyl(meth)acrylate, and perfluorodecyl oxyethyl(meth) acrylate, and the like), fluorinated alkyl(C1-C18)crotonate, fluorinated alkyl(C1-C18)malate, fluorinated alkyl(C1-C18) fumarate, fluorinated alkyl(C1-C18)itaconate, fluorinated alkyl substituted olefin (carbon atom numbers of 2 to 10 and fluorine atom number of 1 to 17), for example, perfluorohexyl ethylene or fluorinated olefin in which fluorine atoms are bound to a double bond carbons with carbon numbers of about 2 to 10 and fluorine atom number of about 1 to 20, such as fluorinated olefin, tetrafluoroethylene, trifluoroethylene, fluorinated vinylidene, or hexafluoropropylene.

Further, a copolymer of a fluorine containing compound and a monomer including an ethylenic double bond that does not include a fluorine atom may be used as the binder.

Further, a non-fluoropolymer may be used as the binder. The non-fluoropolymer is a polymer that does not include fluorine. For example, the non-fluoropolymer may be an addition polymer of a monomer including an ethylenic double bond that does not include a fluorine atom. The monomer may be, for example, (cyclo)alkyl(C1-C22)(meta) acrylate (for example, methyl(meth)acrylate, ethyl(meth) acrylate, n-butyl(meth)acrylate, isobutyl(meth)acrylate, cyclohexyl(meth)acrylate, 2-ethylhexyl(meth)acrylate, isodecyl(meth)acrylate, lauryl(meth)acrylate, and octadecyl (meth)acrylate); an aromatic ring-containing (meth)acrylate (for example, benzyl(meth)acrylate and phenylethyl(meth) acrylate); a mono(meth)acrylate of alkylene glycol or dialkylene glycol (C2-C4 alkylene group) (for example, 2-hydroxyethyl(meth)acrylate, 2-hydroxypropyl(meth)acrylate, diethylene glycol mono(meth)acrylate); (poly)glycerinmono(meth)acrylate (degree of polymerization is 1-4); a (meth)acrylate ester-based monomer such as multifunctional (meth)acrylate (for example, (poly)ethylene glycol di(meth) acrylate (degree of polymerization is 1-100), (poly)propylene glycol di(meth)acrylate (degree of polymerization is 1-100), 2,2-bis(4-hydroxyethylphenyl)propane di(meth) acrylate, and trimethylol propane tri(meth)acrylate); a (meth)acrylamide-based monomer such as (meth)acrylamide, (meth)acrylamide-based derivative (for example, N-methylol(meth)acrylamide and diacetone acrylamide); a cyano-containing monomer such as (meth)acrylonitrile, 2-cyanoethyl(meth)acrylate, or 2-cyanoethylacrylamide; a styrene-based monomer such as styrene or a styrene derivative having carbon numbers of 7 to 18 (for example, α-methylstyrene, vinyl toluene, p-hydroxystyrene, and divinyl benzene); a diene-based monomer such as alkadiene having carbon numbers 4 to 12 (for example, butadiene, isoprene, and chloroprene); an alkenyl ester-based monomer such as vinyl (C2-C12) carboxylate ester (for example, vinyl acetate, vinyl propionate, vinyl butyrate, and vinyl octanoate), or (C2-C12) carboxylic acid(meth)allyl ester (for example, (meth)allyl acetate, (meth)allyl propionate, and (meth)allyl octanoate); an epoxy group-containing monomer such as glycidyl(meth)acrylate or (meth)allyl glycidyl ether; a monoolefin such as a monoolefin having carbon numbers 2 to 12 (for example, ethylene, propylene, 1-butene, 1-octene, and 1-dodecene); a halogen atom-containing monomer other than fluorine such as a chlorine, bromine, or iodine atom-containing monomer, such as vinyl chloride or vinylidene chloride; a (meth)acrylate such as acrylate and methacrylate; or a conjugate double-bond-containing monomer such as butadiene or isoprene. Further, the addition polymer may be a copolymer such as an ethylene-vinyl acetate copolymer, a styrene-butadiene copolymer, or an ethylene-propylene copolymer. Further, the vinyl carboxylate ester copolymer may be partially or completely saponified such as polyvinyl alcohol.

Further, the binder may be a polysaccharide and a derivative thereof such as starch, methyl cellulose, carboxy methyl cellulose, hydroxymethyl cellulose, hydroxyethyl cellulose, hydroxypropyl cellulose, carboxymethyl hydroxyethyl cellulose, and nitrocellulose; a phenol resin; a melamine resin; a polyurethane resin; a urea resin; a polyamide resin; a polyimide resin; a polyamide imide resin; a petroleum pitch; and a coal pitch. A plurality of binders may be used as the binder. Also, the binder may act as a thickener in an electrode mixture.

Specifically, the binder may be vinylidene fluoride/ hexafluoropropylene copolymer, polyvinylidene fluoride ("PVDF"), polyacrylonitrile, polymethylmethacrylate, polytetrafluoroethylene ("PTFE") and a mixture thereof, or a styrene butadiene rubber-based polymer may be used, but the binder is not limited thereto and any binder that may be used as a binder in the art may be used.

The solvent may be N-methyl pyrrolidone, acetone or water, but the solvent is not limited thereto and any solvent used in the art may be used.

The current collector may be, for example, a metal such as nickel, aluminum, titanium, copper, gold, silver, platinum, aluminum alloy or stainless steel; a material formed by plasma spraying or arc spraying a carbon material, an active carbon fiber, nickel, aluminum, iron, copper, tin, lead, or an alloy thereof; or a conductive film in which a conductor is dispersed on a resin such as rubber or styrene-ethylene-butylene-styrene copolymer ("SEBS"). For example, aluminum, nickel, or stainless steel may be used. More particularly, aluminum may be used because aluminum may be easily processed into a thin film and is cheap. A shape of the current collector is not particularly limited, and may have a shape of, for example, a thin film, a flat plane, a mesh, a net, a punched or an embossed, or a combination thereof (for example, a meshed flat plane and the like). For example, uneven structure may be formed by etching a surface of a current collector.

An amount of the sodium manganese composite oxide, the conductor, the binder, and the solvent is an amount conventionally used for a sodium battery. One or more of the conductor, the binder, and the solvent may be omitted depending on the purpose and the composition of the sodium battery.

A sodium secondary battery according to another embodiment includes the electrode. For example, the sodium secondary battery includes an electrode, a counter electrode which is opposed to the electrode, and an organic electrolyte solution. For example, the sodium secondary battery includes a positive electrode, a negative electrode, and an organic electrolyte solution. The sodium battery may, for example, be prepared in the following manner.

First, the positive electrode is prepared as described above.

Then, a negative electrode is prepared.

The negative electrode in the sodium battery may include a sodium metal, a sodium metal-based alloy, a sodium intercalating compound, or a carbonaceous material, but the negative electrode is not limited thereto. Any material that may be used as a negative active material in the art and any material that includes sodium or intercalates/deintercalates sodium may be used.

The negative electrode determines the capacity of the sodium battery and thus, the negative electrode may, for example, be a sodium metal. The sodium metal-based alloy may, for example, be an alloy of sodium and aluminum, tin, indium, calcium, titanium, or vanadium.

For example, the negative electrode may be sodium in a metal state having a thickness of about 3 µm to about 500 µm, and may be used in various shapes such as a film, a sheet, a foil, a net, a porous body, a foaming body, and a non-woven fabric.

When a negative active material other than sodium metal or sodium alloy is used, a carbonaceous material having a graphene structure may be used. A mixed negative electrode of materials such as graphite, graphitized carbon and the like, a mixed negative electrode of a carbonaceous material and a metal or an alloy, or a composite negative electrode of a carbonaceous material and a metal or an alloy may be used. As the carbonaceous material that may electrochemically intercalate/deintercalate sodium ions, natural graphite, synthetic graphite, mesophase carbon, expandable graphite, carbon fiber, vapor grown carbon fiber, a pitch-based carbonaceous material, needle coke, petroleum coke, polyacrylonitrile-based carbon fiber, carbon black, or an amorphous carbonaceous material synthesized by thermal decomposition of 5-membered or 6-membered cyclic hydrocarbon or a cyclic oxygen-containing organic compound, may be used.

When the negative active material is in a powder form, the negative electrode may be manufactured as follows. The negative electrode may be manufactured in the same manner as in manufacturing the positive electrode, except that a negative active material is used instead of the sodium manganese composite oxide. Also, a conductor, a binding agent, and a solvent in a negative active material composition may be the same as those used in the positive electrode.

For example, the negative active material, the conductor, the binding agent, and solvent may be mixed to prepare the negative active material composition, and the negative active material composition may be directly coated on a copper current collector to manufacture a negative electrode plate. Alternatively, the negative active material composition may be cast on a separate scaffold and then a negative active material film peeled off from the scaffold may be laminated on the copper current collector to prepare a negative electrode plate.

As the negative current collector, any current collector may be used without being limited to texture, shape, or manufacturing method. For example, a copper foil such as a perforated copper foil, an expanded metal, or a foamed metal plate, having a thickness of about 10 µm to about 100 µm, having a thickness of about 10 µm to about 100 µm and a hole diameter of about 0.1 mm to about 10 mm, may be used. A material for the negative current collector may be stainless steel, titanium, nickel or the like, in addition to copper.

An amount of the negative active material, the conducting agent, the binding agent, and the solvent may be an amount conventionally used in a sodium battery.

Then, a separator is prepared.

Then, a separator may be prepared. The sodium battery may additionally include a separator disposed between the electrode (e.g., the positive electrode) and the counter electrode (e.g., the negative electrode).

The separator may have any composition that may withstand the operating condition in which the sodium battery is used, for example, the separator may be a polymer non-woven fabric such as a non-woven fabric made of a polypropylene material or a non-woven fabric made of a polyphenylene sulfide material, a porous film made of an olefin-based resin such as polyethylene or polypropylene, or two or more of these may be used together.

The separator may have a low resistance to migration of ions of an electrolyte and an excellent electrolytic solution-retaining capability. For example, the separator may be selected from glass fiber, polyester, polyethylene, polypropylene, polytetrafluoroethylene ("PTFE"), and a combination thereof, each of which may be nonwoven or woven.

For example, the separator may be manufactured by the method described below.

A separator composition is prepared by mixing a polymer resin, a filler, and a solvent. The separator composition may be directly coated and then dried on a negative active material layer to prepare a separator. Alternatively, the separator composition may be cast and then dried on a scaffold, and then a separator film peeled off from the scaffold may be laminated on a negative active material layer to prepare a separator. The filler may be omitted.

The polymer resin used in preparing the separator is not particularly limited, and any material used as a binding agent for an electrode plate may be used. For example, polyethylene, polypropylene, a vinylidene fluoride/hexafluoropropylene copolymer, polyvinylidene fluoride ("PVDF"), polyacrylonitrile, polymethylmetacrylate, or a mixture thereof may be used. The filler used for preparing the separator may be inorganic particles. As long as the solvent may dissolve the polymer resin, and may form holes within the polymer during drying process, any solvent in the art may be used for preparing the separator.

Further, the separator may be separately prepared by a method known in the art and then laminated on the negative active material layer. For example, a dry manufacturing method may be used in which polypropylene or polyethylene is melted and then pressed into a film, annealed at a low temperature to grow a crystal domain within the film, and then a product thereof is stretched to expand an amorphous region to form a microporous film. For example, a wet manufacturing method may be used in which low molecular weight materials such as a hydrocarbon solvent and polymers such as polypropylene, polyethylene, or the like are mixed to prepare a film, and then the solvent or low molecular weight compounds are removed from the film, in which the solvent or low molecular weight compounds are aggregated to form an island phase, by using another volatile solvent or low molecular weight compounds to form a microporous film.

Also, the separator may additionally include additives such as non-conductive particles, other fillers, and fiber compounds to control strength, hardness, and thermal shrinkage. For example, the separator may additionally include inorganic particles. By including the inorganic particles, oxidation resistance of the separator improves and deterioration of battery characteristics may be suppressed. The inorganic particles may be alumina ($Al_2O_3$), silica ($SiO_2$), titania ($TiO_2$), or the like. An average diameter of the inorganic particles may be about 10 nm to about 5 μm. When the average diameter is less than 10 nm, crystallinity of the inorganic particles decreases such that effects from the addition may be small, and when the average diameter exceeds 5 μm, dispersion of the inorganic particles may not occur easily.

The separator may have a multilayer structure including at least one polymer layer to increase an internal tearing strength and mechanical strength. For example, the separator may be a polyethylene/polypropylene laminate, a polyethylene/polypropylene/polyethylene laminate, or a non-woven fabric/polyolefin laminate.

Then, an electrolyte solution is prepared.

The electrolyte solution is liquid including sodium in an ionic state and is a solvent including a sodium salt, which becomes an electrolyte, dissolved therein. A battery may be manufactured by using an organic electrolyte solution including an organic solvent.

The sodium salt used as the electrolyte may be, for example, $NaClO_4$, $NaPF_6$, $NaBF_4$, $NaCF_3SO_3$, $NaN(CF_3SO_2)_2$, $NaN(C_2F_5SO_2)_2$, and $NaC(CF_3SO_2)_3$, but the sodium salt is not limited thereto and any salt that may be used as the sodium salt in the art may be used. For example, the salt used as the lithium salt in the lithium battery may have lithium substituted with sodium.

A concentration of the electrolyte in the organic electrolyte solution may be suitably set by considering solubility of the electrolyte with respect to the electrolyte solution. For example, the concentration of the electrolyte may be about 0.1 M to about 5 M. For example, the concentration of the electrolyte may be about 0.3 M to about 3 M or about 0.8 M to about 1.5 M. When the concentration of the electrolyte is 0.1 M or greater, ion conductivity of the electrolyte increases such that an internal resistance of the sodium battery decreases, and when the concentration is 5 M or less, viscosity of the electrolyte solution decreases such that the internal resistance of the sodium battery decreases.

As an organic solvent for dissolving the electrolyte, a polar organic solvent may be used. Moisture content of the electrolyte solution including the polar organic solvent may be 200 ppm or less. For example, the moisture content of the electrolyte solution including the polar organic solvent may be 50 ppm or less, or 20 ppm or less. By suppressing the moisture content in the electrolyte solution including the polar organic solvent, effects due to electrolysis of water on an electrode, and more particularly, reduction of voltage, may be inhibited.

The organic solvent in the organic electrolyte solution may be a polar aprotic organic solvent. For example, the organic electrolyte solution for the sodium secondary battery may include at least one organic solvent selected from dimethylether, diethylether, dimethyl carbonate, diethyl carbonate, ethylmethyl carbonate, dipropyl carbonate, methylpropyl carbonate, ethylpropyl carbonate, ethylene carbonate, propylene carbonate, butylene carbonate, methyl acetate, ethyl acetate, n-propyl acetate, dimethylacetate, methyl propionate, ethyl propionate, γ-butyrolactone, decanolide, valerolactone, mevalonolactone, caprolactone, dibutyl ether, tetraglyme, diglyme, polyethylene glycol dimethylether, dimethoxy ethane, 2-methyl tetrahydrofuran, 2,2-dimethyl tetrahydrofuran, 2,5-dimethyl tetrahydrofuran, cyclohexanone, triethylamine, triphenylamine, triether phosphine oxide, acetonitrile, dimethyl formamide, 1,3-dioxolane, and sulfolane, but the organic solvent is not limited thereto and any solvent that may be used as an organic solvent in the art may be used.

Figure 6:
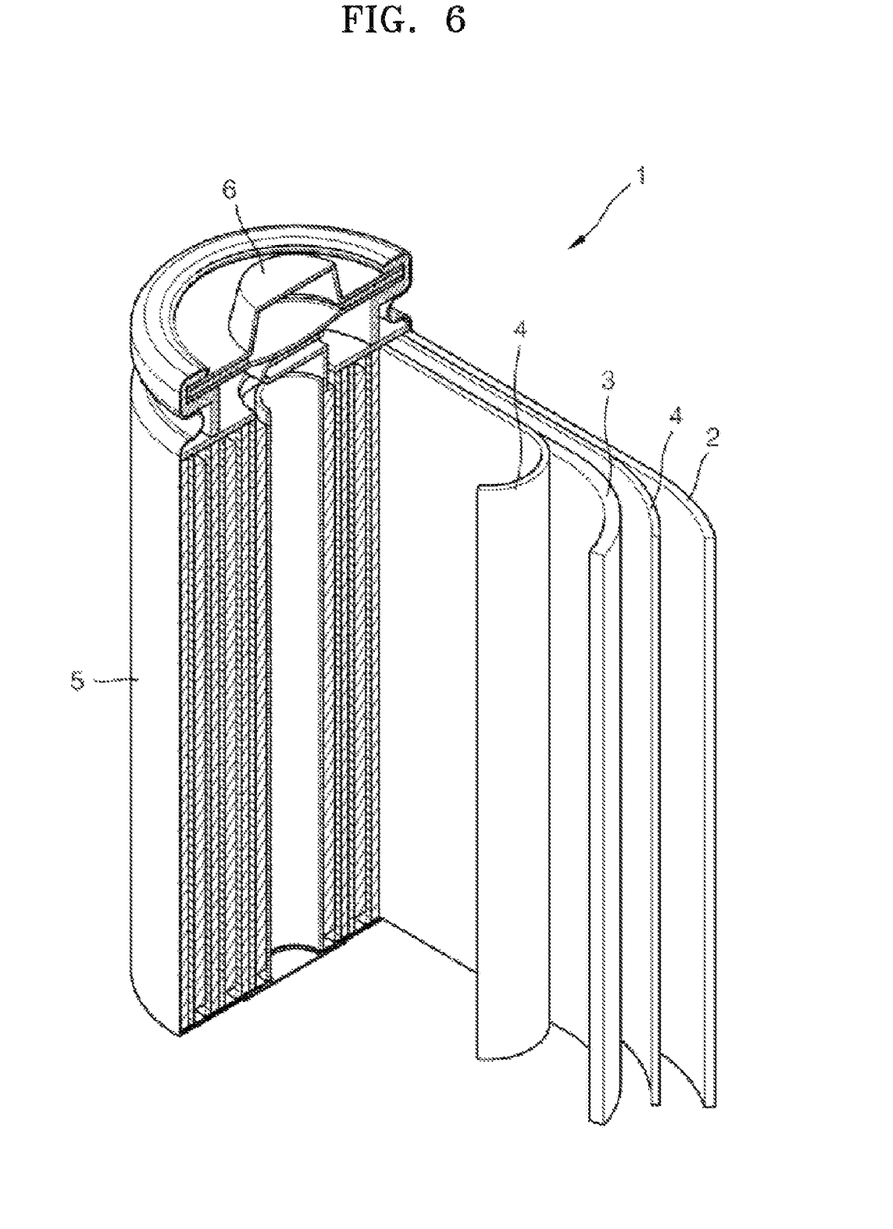
FIG. 6 is a schematic diagram of an embodiment of a sodium battery.

As shown in FIG. 6, a sodium secondary battery 1 includes a positive electrode 3, a negative electrode 2, and a separator 4. The positive electrode 3, the negative electrode 2, and separator 4 may be wound or folded and then enclosed in a battery case 5. Thereafter, an organic electrolyte solution is injected into the battery case 5 and then sealed by a cap assembly 6 to complete the sodium battery 1. The battery case may be a cylindrical, rectangular, or thin film type case. For example, the sodium battery 1 may be a large thin film type battery. The sodium battery 1 may be a sodium ion battery.

A separator may be disposed between the positive electrode and the negative electrode to manufacture a battery structure. After the battery structure is layered into a bicell structure, the bicell structure is impregnated in an organic electrolyte solution, and a product obtained therefrom is enclosed in a pouch and then sealed to complete a sodium polymer battery.

Also, a plurality of the battery structures is layered to form a battery pack, and the battery pack may be used for all devices that require high capacity. For example, the battery pack may be used for notebook computers, smart phones, electric vehicles or the like.

Also, the sodium battery has excellent storage stability and thermal stability, and thus, the sodium battery may be used in energy storage systems ("ESS") and electric vehicles ("EV"). For example, the sodium battery may be used in hybrid vehicles such as plug-in hybrid electric vehicles ("PHEV").

Hereinafter, exemplary embodiments will be described in detail with reference to examples. However, the examples are illustrated for illustrative purposes only and do not limit the scope.

EXAMPLES (Preparation of a Positive Active Material)

Example 1

$Na_2CO_3$ (99.5% available from Aldrich), $Mn_2O_3$ (99% available from Aldrich) and $Al_2O_3$ (nanopowder, available from Aldrich) were mixed at a predetermined molar ratio, and then a mixture obtained therefrom was inserted into a paste-mixer (vacuum mixer available from Dae Wha Tech) and then mixed at a speed of 1000 rpm for 10 minutes to prepare a second mixture.

The second mixture was inserted into an alumina crucible and then heat-treated at a temperature of 900° C. for 10 hours while air was flowing therethrough at an amount of at a rate of 10 L/minute to prepare a composite transition metal oxide.

The prepared sodium manganese composite oxide was $Na_{0.6}Al_{0.1}Mn_{0.9}O_2$.

Example 2

A sodium manganese composite oxide was manufactured in the same manner as in Example 1, except that a molar ratio of $Na_2CO_3$, $Mn_2O_3$ and $Al_2O_3$ was changed.

The prepared sodium manganese composite oxide was $Na_{2/3}Al_{0.1}MnO_2$.

Example 3

A sodium manganese composite oxide was manufactured in the same manner as in Example 1, except that a molar ratio of $Na_2CO_3$, $Mn_2O_3$ and $Al_2O_3$ was changed.

The prepared sodium manganese composite oxide was $Na_{2/3}Al_{0.1}Mn_{0.95}O_2$.

Example 4

A sodium manganese composite oxide was manufactured in the same manner as in Example 1, except that a molar ratio of $Na_2CO_3$, $Mn_2O_3$ and $Al_2O_3$ was changed.

The prepared sodium manganese composite oxide was $Na_{2/3}Al_{0.1}Mn_{0.9}O_2$.

Example 5

A sodium manganese composite oxide was manufactured in the same manner as in Example 1, except that a molar ratio of $Na_2CO_3$, $Mn_2O_3$ and $Al_2O_3$ was changed.

The prepared sodium manganese composite oxide was $Na_{0.75}Al_{0.1}Mn_{0.9}O_2$.

Example 6

A sodium manganese composite oxide was manufactured in the same manner as in Example 1, except that a molar ratio of $Na_2CO_3$, $Mn_2O_3$ and $Al_2O_3$ was changed.

The prepared sodium manganese composite oxide was $Na_{0.8}Al_{0.1}Mn_{0.9}O_2$.

Example 7

A sodium manganese composite oxide was manufactured in the same manner as in Example 1, except that a molar ratio of $Na_2CO_3$, $Mn_2O_3$ and $Al_2O_3$ was changed.

The prepared sodium manganese composite oxide was $NaAl_{0.1}Mn_{0.9}O_2$.

Example 8

A sodium manganese composite oxide was manufactured in the same manner as in Example 1, except that a molar ratio of $Na_2CO_3$, $Mn_2O_3$ and $Al_2O_3$ was changed.

The prepared sodium manganese composite oxide was $Na_{2/3}Al_{0.01}MnO_2$.

Example 9

$Na_2CO_3$ (99.5% available from Aldrich), $Mn_2O_3$ (99% available from Aldrich) and $Al_2O_3$ (nanopowder, available from Aldrich) were mixed at a predetermined molar ratio, and then a mixture obtained therefrom was inserted into a paste-mixer (vacuum mixer available from Dae Wha Tech) and then mixed at a speed of 1000 rpm for 10 minutes to prepare a second mixture.

The second mixture was inserted into an alumina crucible and then heat-treated at a temperature of 900° C. for 10 hours while air was flowing therethrough at an amount of at a rate of 10 L/minute to prepare a composite transition metal oxide.

The prepared sodium manganese composite oxide was $Na_{2/3}Al_{0.01}Mn_{0.5}Fe_{0.5}O_2$.

Comparative Example 1

$Na_2CO_3$ (99.5% available from Aldrich), $Mn_2O_3$ (99% available from Aldrich) and $Al_2O_3$ (nanopowder, available from Aldrich) were mixed at a predetermined molar ratio, and then a mixture obtained therefrom was inserted into a paste-mixer (vacuum mixer available from Dae Wha Tech) and then mixed at a speed of 1000 rpm for 10 minutes to prepare a second mixture.

The second mixture was inserted into an alumina crucible and then heat-treated at a temperature of 900° C. for 10 hours while air was flowing therethrough at an amount of at a rate of 10 L/minute to prepare a composite transition metal oxide.

The prepared sodium manganese composite oxide was $Na_{0.65}MnO_2$.

Comparative Example 2

A manganese oxide composite was manufactured in the same manner as in Comparative Example 1, except that a molar ratio of $Na_2CO_3$, $Mn_2O_3$ and $Al_2O_3$ was changed.

The prepared sodium manganese composite oxide was $Na_{2/3}MnO_2$.

(Manufacturing a Sodium Half Cell)

Example 10

The positive active material (sodium manganese composite oxide) prepared in Example 1, Denka black as a conductor, and polyvinylidene fluoride ("PVdF") as a binder were mixed at a weight ratio of 80:10:10 along with N-methyl pyrrolidone (NMP) in an agate mortar to prepare a slurry. The slurry was bar coated on an aluminum current collector having a thickness of 15 μm, dried and vacuumed at room temperature, dried again at a temperature of 120° C., and then rolled-pressed and punched to prepare a positive electrode plate having a thickness of 55 μm.

A sodium foil was used as a counter electrode, a PTFE separator as a separator, and a solution in which 1.0 M NaPF$_6$ is dissolved in propylene carbonate (PC) was used as an electrolyte to manufacture a 2032-type coin cell.

Examples 11 to 18

A sodium battery was manufactured in the same manner as in Example 10, except that each of the sodium manganese composite oxides prepared in Examples 2 to 9 was used.

Comparative Examples 3 and 4

A sodium battery was manufactured in the same manner as in Example 10, except that each of the sodium manganese composite oxides prepared in Comparative Examples 1 and 2 was used.

Evaluation Example 1: Evaluation of XRD

XRD experiments were performed for the positive active materials prepared in Examples 1 to 9. A part of experimental results are shown in Table 1 and FIG. 1.

Figure 1:
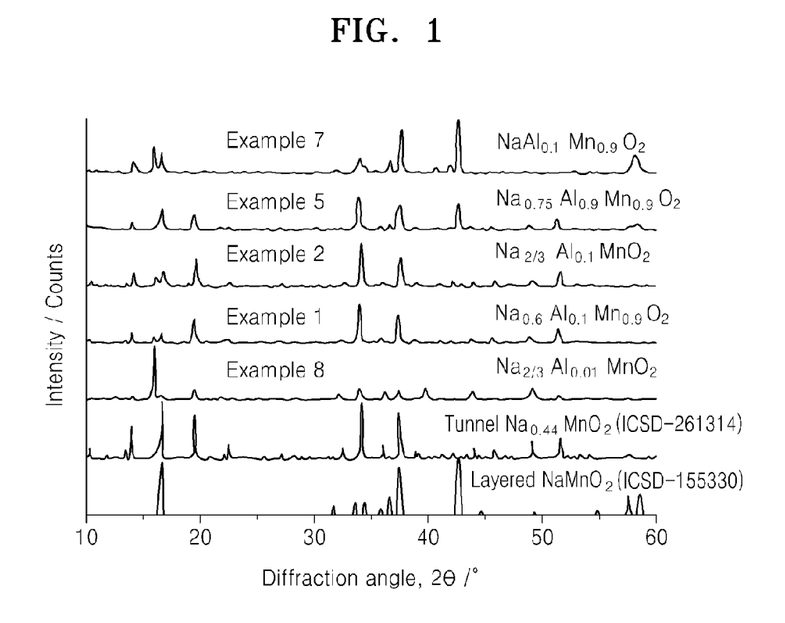
FIG. 1 is a graph of intensity (counts) versus diffraction angle (degrees two-theta, 2θ) which shows x-ray diffraction ("XRD") spectra of sodium manganese composite oxides prepared in Examples 1, 2, 5, 7, 8 and Comparative Examples 1 and 2.

As shown in FIG. 1, characteristic peaks of the positive active materials prepared in Examples 1, 2, 5, 7 and 8 were compared to NaMnO$_2$ having a layered (monoclinic) structure having an XRD spectrum disclosed in an inorganic crystal structure database (ICSD) and Na$_{0.44}$MnO$_2$ having a tunnel (an orthorhombic) structure.

As shown in FIG. 1, the positive active materials prepared in Examples 1 and 2 showed characteristic peaks corresponding to Na$_{0.44}$MnO$_2$ having an orthorhombic structure.

Also, the positive active material prepared in Example 8 showed characteristic peaks corresponding to NaMnO$_2$ having a monoclinic structure.

Also, the positive active materials prepared in Examples 5 and 7 simultaneously showed characteristic peaks corresponding to Na$_{0.44}$MnO$_2$ having an orthorhombic structure and characteristic peaks corresponding to NaMnO$_2$ having a monoclinic structure.

Accordingly, it was confirmed that the positive active materials prepared in Examples 1 and 2 have an orthorhombic structure, the positive active material prepared in Example 8 has a monoclinic structure, and the positive active materials prepared in Examples 5 and 7 have a monoclinic-orthorhombic composite structure.

Although not shown in the drawings, but as shown in Table 1, the positive active materials prepared in Examples 3 and 4 have an orthorhombic structure, the positive active material prepared in Example 7 has a monoclinic structure, the positive active material prepared in Example 6 has a monoclinic-orthorhombic composite structure, the positive active material prepared in Comparative Example 1 has an orthorhombic structure, and the positive active material prepared in Comparative Example 2 has a monoclinic structure.

Evaluation Example 2: Evaluation of Electrical Conductivity

Electrical conductivities of the positive active materials prepared in Examples 1 to 9 and Comparative Examples 1 and 2 were measured by using a 4 point probe method. A device used for measurement was MCP-PD51 available from Mitsubishi Chemical Analytech.

Figure 2A:
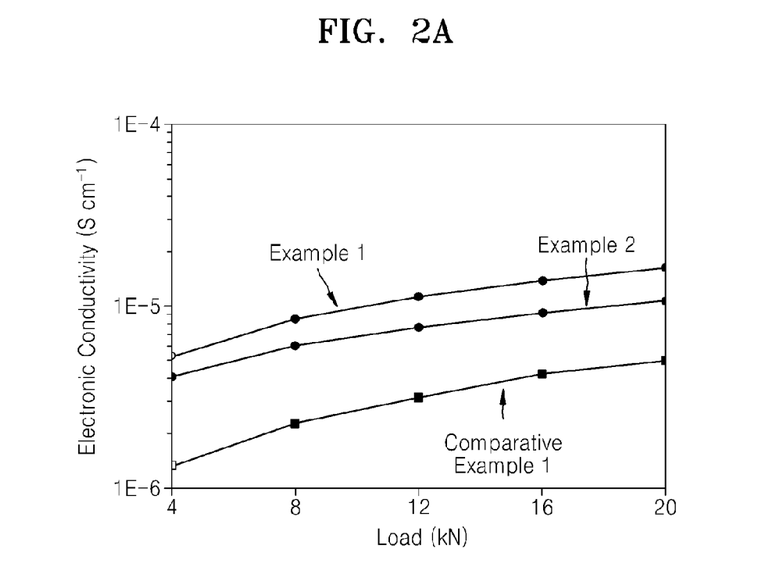
FIG. 2A is a graph of electronic conductivity (Siemens per centimeter, S·cm$^{-1}$) versus load (kilonewtons, kN) which shows the electrical conductivity of the sodium manganese composite oxides prepared in Examples 1 and 2, and Comparative Example 1.
Figure 2B:
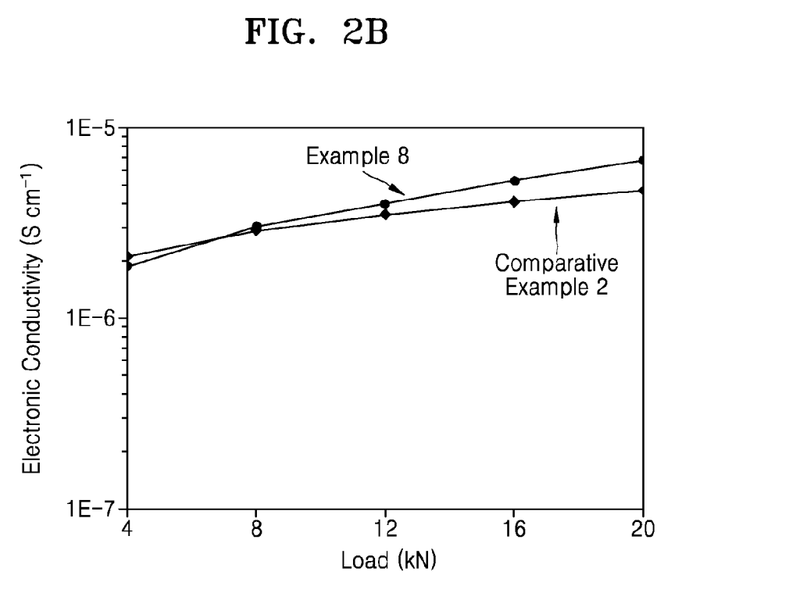
FIG. 2B is a graph of electronic conductivity (Siemens per centimeter, S·cm$^{-1}$) versus load (kilonewtons, kN) which shows the electrical conductivity of the sodium manganese composite oxides prepared in Example 8 and Comparative Example 2.

Some of measurement results are shown in FIGS. 2A and 2B. As shown in FIGS. 2A and 2B, the sodium manganese composite oxide prepared in Examples 1, 2, and 8 have improved electrical conductivities compared to the sodium manganese composite oxide prepared in Comparative Examples 1 and 2. For example, electrical conductivities of the manganese oxide composites prepared in Examples 1, 2, and 8 are 6×10$^{-6}$ S/cm or greater under 40 kN of load.

Evaluation Example 3: Evaluation of XPS (X-ray Photoelectron Spectroscopy)

Figure 3:
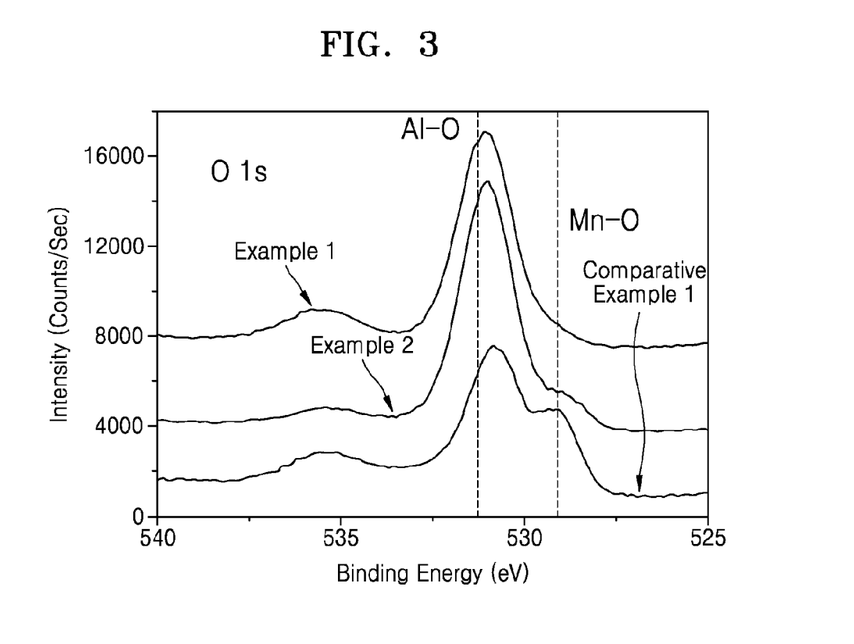
FIG. 3 is a graph of intensity (counts per second (counts/sec)) versus binding energy (electron volts, eV) which shows x-ray photoelectron spectroscopy ("XPS") spectra of the sodium manganese composite oxides prepared in Examples 1 and 2, and Comparative Example 1.

XPS experiments were performed on the positive active materials prepared in Examples 1 to 9 and Comparative Examples 1 and 2, and some results thereof are shown in FIG. 3.

As shown in FIG. 3, the sodium manganese composite oxide prepared in Examples 1 and 2 showed a peak corresponding to a Al—O bond, and a relatively smaller peak corresponding to a Mn—O bond. However, the manganese oxide composite prepared in Comparative Example 1 clearly showed the peak corresponding to the Mn—O bond. In other words, the Al—O bond exists near at least some portions of a surface of the positive active material, and accordingly, the Mn—O bond decreased relatively.

Evaluation Example 4: Evaluation of Lifespan Characteristics

Figure 4A:
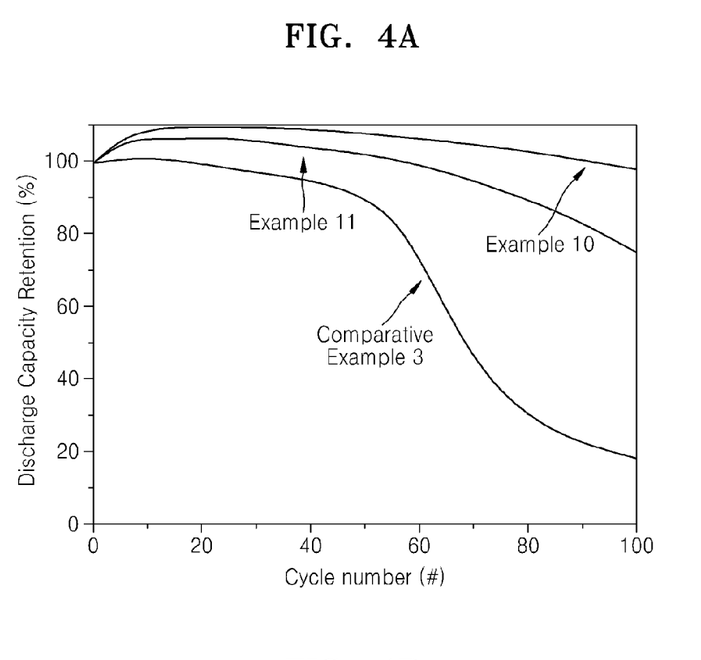
FIG. 4A is a graph of discharge capacity retention (percent, %) versus cycle number (number (#)) showing lifespan characteristics of sodium batteries manufactured in Examples 10 and 11, and Comparative Example 3.
Figure 4B:
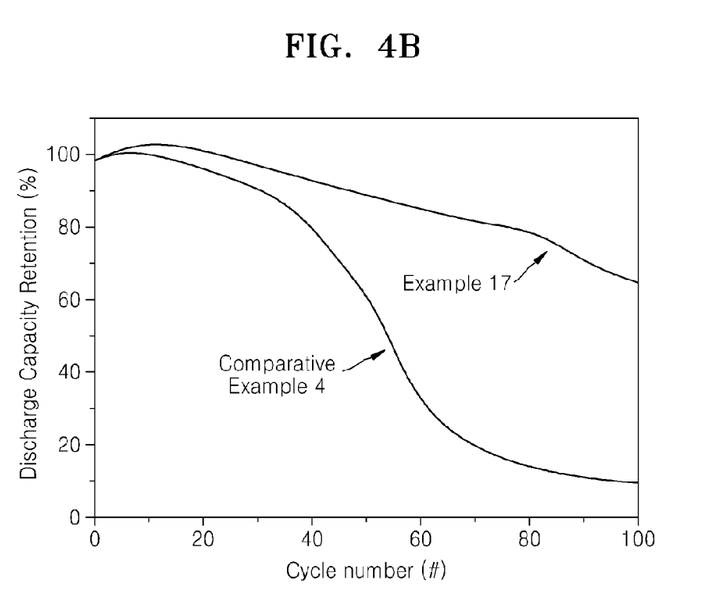
FIG. 4B is a graph of discharge capacity retention (percent, %) versus cycle number (number, (#)) showing lifespan characteristics of sodium batteries manufactured in Example 17 and Comparative Example 4.

The sodium batteries manufactured in Examples 10 to 18 and Comparative Examples 3 and 4 were charged and discharged at a constant current of 0.1 C rate in a voltage range of about 2.0 V to about 3.8 V (vs. a sodium metal) at room temperature (25° C.) up to 100$^{th}$ cycle, and a part of the results obtained therefrom are shown in Table 1 and FIGS. 4A and 4B. A capacity retention rate is represented by Equation 1.

Capacity retention rate [%]=[discharge capacity in 100$^{th}$ cycle/discharge capacity in 1$^{st}$ cycle]×100     Equation 1

TABLE 1

| | Crystal structure | Capacity retention rate [%] |
|---|---|---|
| Example 10 | orthorhombic | 97.7 |
| Example 11 | orthorhombic | 74.2 |
| Example 12 | orthorhombic | 59.9 |
| Example 13 | orthorhombic | 89.2 |
| Example 14 | monoclinic-orthorhombic composite | 47.7 |
| Example 15 | monoclinic-orthorhombic composite | 62.5 |
| Example 16 | monoclinic-orthorhombic composite | 42.6 |
| Example 17 | monoclinic | 64.6 |
| Example 18 | monoclinic | 60.0 |
| Comparative Example 3 | orthorhombic | 18.1 |
| Comparative Example 4 | orthorhombic | 9.7 |

As shown in Table 1, the sodium batteries manufactured in Examples 10 to 18 showed substantially improved lifespan characteristics than the sodium batteries prepared in Comparative Examples 3 and 4.

Evaluation Example 5: Evaluation of Initial Charge and Discharge Characteristics The sodium batteries manufactured in Examples 10 to 18 and Comparative Examples 3 and 4 were charged and discharged once at a constant current of 0.1 C rate in a voltage range of about 2.0 V to about 3.8 V (vs. a sodium metal) at room temperature (25° C.), and a part of the results obtained therefrom are shown in Table 2 and FIG. 5. An initial discharge capacity is represented by Equation 2. An average discharge voltage was calculated by integration of a discharge profile from the charge and discharge profile shown in FIG. 5.

Figure 5:
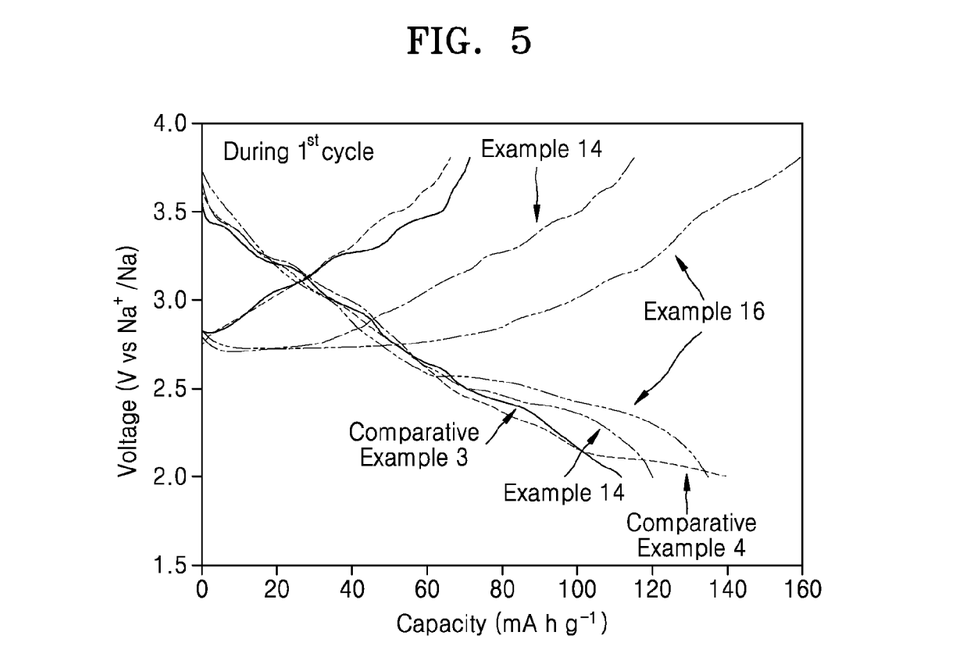
FIG. 5 is a graph of voltage (volts (V) versus Na$^+$/Na) versus capacity (milliampere-hours per gram (mAh·g$^{-1}$) showing initial charge/discharge characteristics of sodium batteries manufactured in Example 14 and 16, and Comparative Examples 3 and 4.

Initial discharge capacity=discharge capacity at 1$^{st}$ cycle          Equation 2

TABLE 2

|  | Initial discharge capacity [mAh/g] | Average discharge voltage [%] |
|---|---|---|
| Example 14 | 120.4 | 2.70 |
| Example 16 | 134.8 | 2.74 |
| Comparative Example 3 | 111.7 | 2.74 |
| Comparative Example 4 | 139.2 | 2.59 |

As shown in Table 2, the sodium batteries manufactured in Examples 14 to 16 showed initial discharge capacities improved from that of the sodium battery manufactured in Comparative Example 3, and improved average discharge voltages from that of the sodium battery manufactured in Comparative Example 4.

As described above, according to the one or more of the above embodiments, initial discharge capacity and lifespan characteristics of a sodium secondary battery may be improved by using a novel sodium manganese composite oxide having improved electrical conductivity and structural stability.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A sodium manganese composite oxide represented by Formula 1:

$Na_xMa_yMn_zMb_vO_{(2+d)}$          Formula 1 wherein, 0.2≤x≤0.8, 0<y≤0.2, 0<z≤1, 0≤v<1, 0<z+v≤1, and −0.3≤d<1,

Ma is a metal which is electrochemically inactive between 2 volts and 3.8 volts versus Na/Na$^+$, Mb is different from Ma and Mn, and is at least one transition metal selected from elements of Groups 4 to 12 of the periodic table of the elements, and the sodium manganese composite oxide has at least one of a monoclinic structure and an orthrorhombic structure.

2. The sodium manganese composite oxide of claim 1, wherein 0.6≤x≤0.8, and 0.01≤y≤0.1.

3. The sodium manganese composite oxide of claim 1, wherein 2/3≤x≤0.8, y=0.1, and z=0.9.

4. The sodium manganese composite oxide of claim 1, wherein an oxidation number of Ma does not change during intercalation and deintercalation of sodium.

5. The sodium manganese composite oxide of claim 1, wherein Ma is at least one metal selected from aluminum (Al), molybdenum (Mo), tungsten (W), zirconium (Zr), ruthenium (Ru), rhodium (Rh), palladium (Pd), and platinum (Pt).

6. The sodium manganese composite oxide of claim 1, wherein Mb is at least one transition metal selected from elements of Groups 8 to 10 of the periodic table of the elements.

7. The sodium manganese composite oxide of claim 1, wherein Mb is at least one transition metal selected from iron (Fe), nickel (Ni), cobalt (Co), vanadium (V), titanium (Ti), and chromium (Cr).

8. The sodium manganese composite oxide of claim 1, wherein the sodium manganese composite oxide has a monoclinic structure.

9. The sodium manganese composite oxide of claim 1, wherein the sodium manganese composite oxide has an orthorhombic structure.

10. The sodium manganese composite oxide of claim 1, wherein the sodium manganese composite oxide has a monoclinic-orthorhombic composite structure.

11. The sodium manganese composite oxide of claim 1, wherein the sodium manganese composite oxide is represented by Formula 2:

$Na_xAl_yMn_zMb_vO_{(2+d)}$          Formula 2 wherein, 0.2≤x≤0.8, 0≤y≤0.2, 0<z≤1, 0<v<1, 0<z+v≤1, −0.3≤d<1, and

Mb is different from aluminum (Al) and manganese (Mn), and is at least one transition metal selected from elements of Groups 4 to 12 of the periodic table of the elements.

12. The sodium manganese composite oxide of claim 1, wherein the sodium manganese composite oxide comprises an Al—O bond near a surface of the sodium manganese composite oxide.

13. The sodium manganese composite oxide of claim 1, wherein the sodium manganese composite oxide is represented by Formula 3:

$Na_xAl_yMn_zMc_vO_{2+d}$          Formula 3 wherein, 0.2≤x≤0.8, 0<y≤0.2, 0<z≤1, 0≤v<1, 0<z+v≤1, −0.3≤d<1, and

Mc is at least one transition metal selected from iron (Fe), nickel (Ni), cobalt (Co), vanadium (V), Ti (titanium), and chromium (Cr).

14. The sodium manganese composite oxide of claim 11, wherein 0.6≤x≤0.8, 0.01≤y≤0.1.

15. The sodium manganese composite oxide of claim 11, wherein 2/3<x≤0.8, y=0.1, z=0.9.

16. The sodium manganese composite oxide of claim 1, wherein the sodium manganese composite oxide has an electrical conductivity of 6×10$^{−6}$ Siemens per centimeter or greater under a load of 40 kilonewtons or greater.

17. An electrode comprising the sodium manganese composite oxide of claim 1.

18. The electrode of claim 17, wherein the sodium manganese composite oxide has a monoclinic-orthorhombic composite structure, and wherein the sodium manganese composite oxide having the monoclinic-orthorhombic composite structure has a greater initial discharge capacity than a sodium manganese composite oxide having an orthorhombic structure.

19. The electrode of claim 17, wherein, in a sodium secondary battery comprising the sodium manganese composite oxide, a capacity retention rate after 100 cycles of charge and discharge between 2.0 volts and 3.8 volts versus Na metal, with a constant current of a 0.1 C rate, is 40 percent or greater.

20. A sodium secondary battery comprising:
the electrode according to claim 17.

21. The sodium secondary battery of claim 20, further comprising a counter electrode which is opposed to the electrode, wherein the counter electrode comprises a sodium metal, a sodium metal alloy, a sodium intercalation compound, or a carbonaceous material.

22. The sodium secondary battery of claim 21, further comprising a separator disposed between the electrode and the counter electrode.

\* \* \* \* \*